US010037525B2

(12) United States Patent
Neafsey

(10) Patent No.: US 10,037,525 B2
(45) Date of Patent: Jul. 31, 2018

(54) CONTROL SYSTEM AND METHOD

(71) Applicant: Schlage Lock Company LLC, Indianapolis, IN (US)

(72) Inventor: Jeffrey Scott Neafsey, Golden, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 14/177,186

(22) Filed: Feb. 10, 2014

(65) Prior Publication Data
US 2014/0229385 A1    Aug. 14, 2014

Related U.S. Application Data

(60) Provisional application No. 61/762,742, filed on Feb. 8, 2013.

(51) Int. Cl.
*G06Q 20/36* (2012.01)
*G07C 9/00* (2006.01)
*G06Q 20/32* (2012.01)
*G06Q 20/20* (2012.01)
*G06Q 20/42* (2012.01)
*G06Q 20/04* (2012.01)

(52) U.S. Cl.
CPC ..... *G06Q 20/3674* (2013.01); *G06Q 20/0457* (2013.01); *G06Q 20/204* (2013.01); *G06Q 20/327* (2013.01); *G06Q 20/3278* (2013.01); *G06Q 20/425* (2013.01); *G07C 9/00309* (2013.01)

(58) Field of Classification Search
USPC ..... 705/64, 67; 713/189, 193; 340/10.1, 8.1, 340/539.13; 709/204; 726/4; 455/410, 455/456.3; 345/158
See application file for complete search history.

(56) References Cited

U.S. PATENT DOCUMENTS 6,778,068 B2   8/2004  Wolfe
7,580,699 B1 * 8/2009  Shaw ................... G06Q 20/102
                                                     455/410

(Continued)

FOREIGN PATENT DOCUMENTS

EP        2364006        9/2011
JP      2009127336       11/2009

(Continued)

OTHER PUBLICATIONS

Promoting collaborative mobile payment by using NFC-Mircro SD technology 2013 IEEE 10th international conference on services computing Szu-hui Wu Chyan Yang.*

(Continued)

*Primary Examiner* — Steven S Kim
*Assistant Examiner* — El Mehdi Oussir
(74) *Attorney, Agent, or Firm* — Taft Stettinius & Hollister LLP

(57) ABSTRACT

A wireless connection may be established between a mobile device and a reader device and/or a sensor. The reader device and/or sensor may authenticate the mobile device. The reader device and/or sensor may receive a credential or token from the mobile device. An action may be performed based on certain criteria such as if the credential or token is valid.

9 Claims, 4 Drawing Sheets

(56) References Cited

U.S. PATENT DOCUMENTS

| | | | |
|---|---|---|---|
| 8,126,806 B1* | 2/2012 | DiMartino | G06Q 20/105 340/5.7 |
| 8,146,802 B1* | 4/2012 | Ramachandran | G06K 7/0004 235/379 |
| 8,334,768 B2* | 12/2012 | Eaton | H04W 4/028 340/539.11 |
| 8,522,019 B2* | 8/2013 | Michaelis | G07C 9/00039 370/310 |
| 8,625,796 B1* | 1/2014 | Ben Ayed | H04L 63/0853 380/258 |
| 8,799,085 B2* | 8/2014 | Fisher | H04W 4/21 705/16 |
| 9,244,152 B1* | 1/2016 | Thiagarajan | G01S 5/10 |
| 9,262,879 B2* | 2/2016 | Ahearn | G07C 9/00174 |
| 9,307,403 B2* | 4/2016 | Neafsey | H04W 12/02 |
| 9,312,926 B2* | 4/2016 | Neafsey | H04B 5/0056 |
| 9,406,180 B2* | 8/2016 | Eberwine | G07C 9/00174 |
| 9,508,206 B2* | 11/2016 | Ahearn | G07C 9/00174 |
| 9,704,317 B2* | 7/2017 | Baumgarte | G07C 9/00309 |
| 9,711,036 B2* | 7/2017 | Fadell | G08B 25/008 |
| 2002/0082921 A1 | 6/2002 | Rankin | |
| 2002/0147006 A1 | 10/2002 | Coon | |
| 2002/0183008 A1 | 12/2002 | Menard et al. | |
| 2003/0005316 A1* | 1/2003 | Girard | G06F 21/88 713/193 |
| 2004/0019571 A1* | 1/2004 | Hurwitz | G06Q 20/06 705/65 |
| 2004/0118930 A1* | 6/2004 | Berardi | G06K 7/0008 235/492 |
| 2005/0206498 A1 | 9/2005 | Tsui et al. | |
| 2006/0224901 A1 | 10/2006 | Lowe | |
| 2006/0235753 A1* | 10/2006 | Kameyama | B60H 1/00742 705/15 |
| 2006/0270421 A1* | 11/2006 | Phillips | G08B 21/0236 455/457 |
| 2007/0050259 A1 | 3/2007 | Wesley | |
| 2007/0290793 A1 | 12/2007 | Tran | |
| 2008/0020738 A1* | 1/2008 | Ho et al. | 455/414.1 |
| 2008/0222711 A1 | 9/2008 | Michaelis | |
| 2008/0290990 A1 | 11/2008 | Scheffzin et al. | |
| 2009/0037326 A1* | 2/2009 | Chitti | G06Q 20/10 705/39 |
| 2009/0143104 A1* | 6/2009 | Loh | G06Q 20/32 455/558 |
| 2009/0163140 A1 | 6/2009 | Packham et al. | |
| 2009/0167488 A1 | 7/2009 | Hays et al. | |
| 2009/0171799 A1* | 7/2009 | Ying | G06Q 20/20 705/18 |
| 2009/0193500 A1* | 7/2009 | Griffin | G06Q 20/10 726/2 |
| 2009/0215469 A1* | 8/2009 | Fisher | H04L 12/588 455/456.3 |
| 2009/0275283 A1* | 11/2009 | Zhuyan | A61B 5/0028 455/41.2 |
| 2010/0031349 A1* | 2/2010 | Bingham | G06F 21/31 726/20 |
| 2010/0075656 A1 | 3/2010 | Howarter et al. | |
| 2010/0112950 A1* | 5/2010 | Haartsen | H04B 5/0056 455/41.3 |
| 2010/0201536 A1 | 8/2010 | Robertson et al. | |
| 2011/0084831 A1 | 4/2011 | Tran | |
| 2011/0113210 A1* | 5/2011 | Klapman | G06F 17/30091 711/163 |
| 2011/0151900 A1* | 6/2011 | Yu et al. | 455/466 |
| 2011/0302630 A1* | 12/2011 | Nair | G06F 21/41 726/4 |
| 2011/0311052 A1 | 12/2011 | Myers | |
| 2012/0154115 A1 | 6/2012 | Herrala | |
| 2012/0197740 A1* | 8/2012 | Grigg | G06Q 20/20 705/16 |
| 2012/0234058 A1 | 9/2012 | Neil | |
| 2012/0280783 A1 | 11/2012 | Gerhardt et al. | |
| 2012/0280789 A1 | 11/2012 | Gerhardt et al. | |
| 2012/0280790 A1* | 11/2012 | Gerhardt | G07C 9/00309 340/5.61 |
| 2012/0293305 A1* | 11/2012 | Shaw et al. | 340/8.1 |
| 2012/0306745 A1* | 12/2012 | Moore | G06F 3/017 345/158 |
| 2013/0006847 A1* | 1/2013 | Hammad | G06Q 20/20 705/39 |
| 2013/0013508 A1* | 1/2013 | Carlson | 705/44 |
| 2013/0063251 A1* | 3/2013 | Allen | G06Q 10/0833 340/10.1 |
| 2013/0176107 A1 | 7/2013 | Dumas et al. | |
| 2013/0297075 A1* | 11/2013 | Land, III | G05B 15/02 700/275 |
| 2013/0304824 A1* | 11/2013 | Garcia Manchado | H04W 4/021 709/204 |
| 2014/0025958 A1* | 1/2014 | Calman | G06Q 20/3224 713/189 |
| 2014/0049361 A1* | 2/2014 | Ahearn | G07C 9/00309 340/5.7 |
| 2014/0049362 A1* | 2/2014 | Ahearn | G07C 9/00174 340/5.51 |
| 2014/0049363 A1* | 2/2014 | Ahearn | G07C 9/00571 340/5.51 |
| 2014/0049365 A1* | 2/2014 | Ahearn | G07C 9/00571 340/5.51 |
| 2014/0077929 A1* | 3/2014 | Dumas | G07C 9/00571 340/5.61 |
| 2015/0061859 A1* | 3/2015 | Matsuoka | G08B 27/00 340/501 |
| 2016/0014131 A1* | 1/2016 | Neafsey | H04L 63/061 713/171 |
| 2016/0379428 A1 | 12/2016 | Ahearn et al. | |
| 2017/0092031 A1* | 3/2017 | Ahearn | G07C 9/00309 |
| 2017/0132863 A1* | 5/2017 | Ahearn | G07C 9/00309 |
| 2017/0145713 A1* | 5/2017 | Ahearn | E05B 45/06 |
| 2017/0148244 A1* | 5/2017 | Ahearn | G07C 9/00309 |

FOREIGN PATENT DOCUMENTS

| | | |
|---|---|---|
| WO | 20070792332 | 7/2007 |
| WO | 2008056152 | 5/2008 |
| WO | 2012/092293 A2 | 7/2012 |

OTHER PUBLICATIONS

Channel Estimation and Equalization Algorithms for Long Range Bluetooth Signal Reception Ingolf Held Albert chen.*

Arto Hamalainen, P. J. (2004). Applying wirless technology to an access control system. WAWC'03 conference, Lappeenranta University of Technology, Finland. www.it.lut.fi/WAWC.*

International Search Report and Written Opinion of the International Searching Authority; PCT/US2014/015652, dated Aug. 15, 2014; 10 pages.

Extended European Search Report; European Patent Office; European Patent Application No. 14749217.7; dated Aug. 1, 2016; 8 pages.

Mexican Office Action; Mexican Patent Office; Mexican Patent Application No. MX/a/2015/010311; dated Feb. 7, 2017; 4 pages.

Canadian Office Action; Canadian Intellectual Property Office; Canadian Patent Application No. 2,900,762; dated Sep. 29, 2016; 5 pages.

European Examination Report; European Patent Office; European Patent Application No. 147492171; dated Feb. 22, 2017; 6 pages.

Canadian Office Action (Second); Canadian Intellectual Property Office; Canadian Patent Application No. 2,900,762; Sep. 29, 2017; 5 pages.

Mexican Office Action (2nd); Mexican Patent Office; Mexican Patent Application No. MX/a/2015/010311; dated Aug. 17, 2017; 11 pages.

European Summons to Attend Oral Proceedings; European Patent Office; European Patent Application No. 14749217.7; Sep. 29, 2017; 8 pages.

European Search Report; European Patent Office; European Patent Application No. 18158009.3; dated Mar. 16, 2018; 7 Pages.

(56) References Cited

OTHER PUBLICATIONS

Mexican Office Action; Mexican Patent Office; Mexican Patent Application No. MX/a/2015/010311; dated Mar. 19, 2018; 17 pages.

* cited by examiner

CONTROL SYSTEM AND METHOD

CROSS-REFERENCE TO RELATED APPLICATIONS

The present application claims the benefit of U.S. Provisional Patent Application No. 61/762,742, filed on Feb. 8, 2013, which is hereby incorporated by reference in its entirety.

BACKGROUND

The present invention generally relates to transferring information such as credentials. Credentials may be used in various systems and transferred between devices in various ways. Some existing systems have various shortcomings relative to certain applications. Accordingly, there remains a need for further contributions in this area of technology.

SUMMARY

One embodiment of the present invention is a unique system and method for transferring information such as credentials. Other embodiments include apparatuses, systems, devices, hardware, methods, and combinations for transferring information. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF EXEMPLARY EMBODIMENTS

Figure 1:
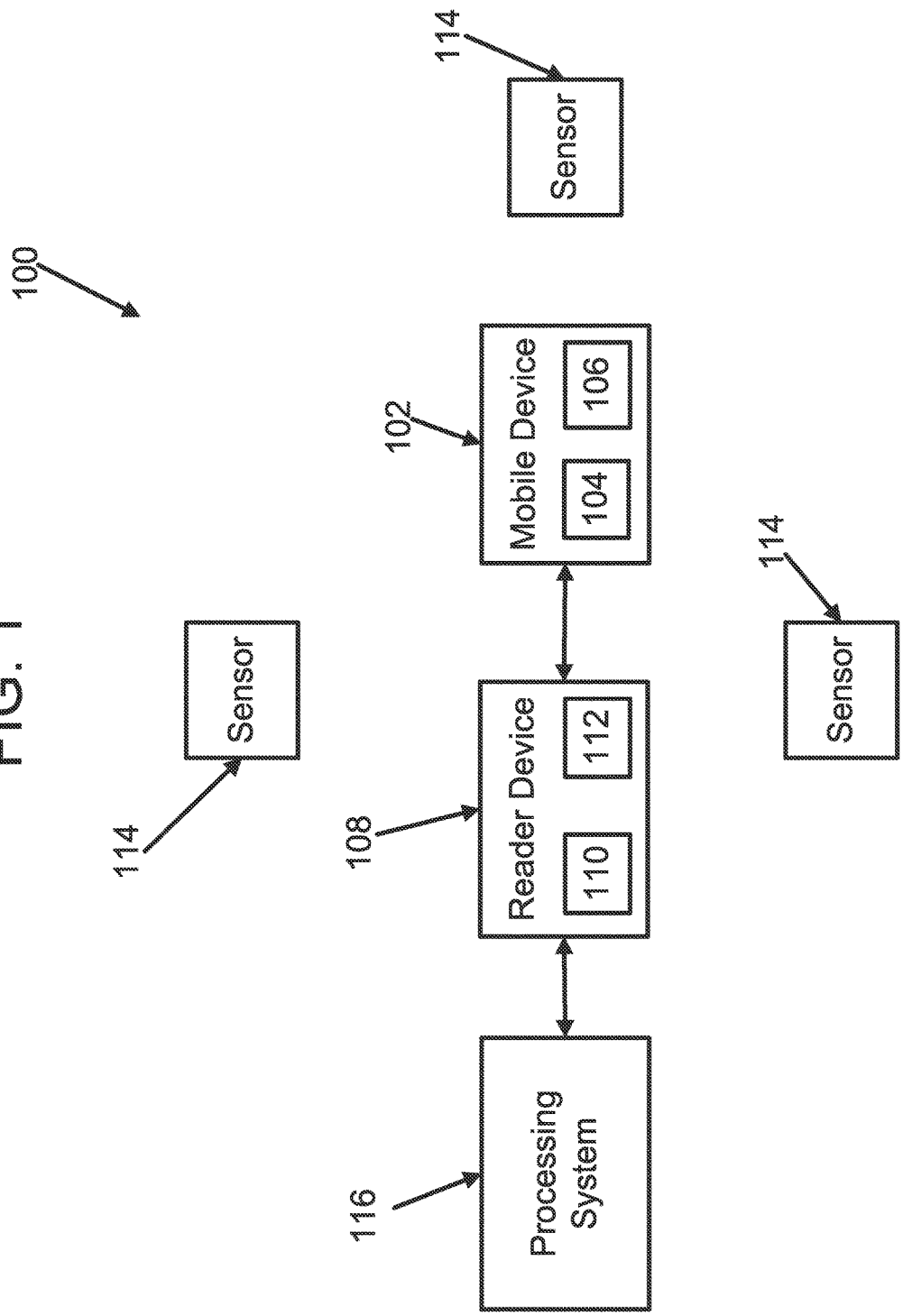
FIG. 1 is a schematic block diagram of an exemplary system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present application is generally directed to transmitting data from a mobile device to a reader device. FIG. 1 illustrates a schematic block diagram of an exemplary system 100, which is an access control system. It is contemplated that in other embodiments, the system 100 may be a payment system, vending system, transit system or the like. The system 100 includes a mobile device 102 with one or more transceivers 104 that allows the mobile device 102 to transmit data to and receive data from another device. The one or more transceivers 104 may allow the mobile device 102 to communicate on one or more carrier frequencies. For example, the one or more transceivers 104 may include one transceiver that operates at a relatively short distance to implement, e.g., near field communication (NFC) and another transceiver that operates at a relatively greater distance to implement, e.g., WiFi Direct or Bluetooth® including Bluetooth® low energy (BLE). However, it is contemplated that other wireless protocols may be used in the present application. It is also contemplated that one transceiver may operate on multiple carrier frequencies or network bands.

The mobile device 102 includes an application 106 that processes data received from and/or transmitted to another device. In the embodiment shown in FIG. 1, the mobile device 102 is a mobile phone. However, it is contemplated that the mobile device 102 may also be a contactless smartcard or any other device that can communicate secret or secure data with another device.

The system 100 also includes a reader device 108. In the embodiment shown in FIG. 1, the reader device 108 is an electronic lock. It is contemplated that in other embodiments, the reader device 108 may be a reader, a lock, a payment terminal, and/or any other type of device that is configured to communicate with a mobile device 102 to receive a credential, or other secret or secure data for processing. In one form, the reader device 108 is an electronic lock with a NFC reader. The reader device 108 may include one or more transceivers 110 that allow the reader device 108 to communicate with the mobile device 102 over one or more carrier frequencies or network bands. For example, the one or more transceivers 110 may include one transceiver that operates at a relatively short distance to implement, e.g., near field communication (NFC) and another transceiver that operates at a relatively greater distance to implement, e.g., WiFi Direct or Bluetooth® including Bluetooth® low energy (BLE). However, it is contemplated that other wireless protocols may be used in the present application. It is also contemplated that one transceiver operates on multiple carrier frequencies or network bands.

The reader device 108 also includes an application 112 that processes data received from and/or transmitted to the mobile device 102.

The system 100 may also include one or more sensors 114. In the embodiment shown in FIG. 1, the sensors include Bluetooth® transceivers, such as Bluetooth® low energy transceivers. It is contemplated that the sensors 114 include WiFi direct transceivers. The sensors 114 are configured to triangulate the position of the mobile device 102. Furthermore, it is contemplated that at least one of the sensors 114 is configured to receive a credential or token from the mobile device 102. The sensors 114 may be positioned anywhere around the object of interest (e.g., a door or payment terminal) that allows the position of the mobile device 102 to be triangulated. For example, if the system 100 is an access control system, the sensors 114 may be positioned around a door so that the sensors 114 may triangulate the position of the mobile device 102 to determine when the user wishes to open the door. As another example, if the system 100 is a payment system, the sensors 114 may be positioned around a payment terminal to triangulate the position of the mobile device 102 to determine when the user wishes to make a payment. It is contemplated that the sensors 114 may be configured to recognize the user making a gesture with the mobile device 102. It is contemplated that one of the sensors 114 may be the reader device 108.

In one embodiment, the mobile device 102 and the reader device 108 communicate over a carrier frequency that operates over a relatively greater distance such as Bluetooth® low energy. Once the mobile device 102 and the reader device 108 authenticate with one another, the reader device 108 transmits a token to the mobile device 102. The mobile device 102 stores the token until the user of the mobile device 102 chooses to enter the area secured by the reader device 108. When the mobile device 102 is brought within a relatively short distance from the reader device 108, the mobile device 102 transmits the token or credential over the second carrier frequency using, e.g., NFC, to the reader device 108.

In embodiments that include a reader device 108, the reader device 108 may be configured to send the secure data to a processing system 116. Furthermore, in the embodiments that include sensors 114, the sensors 114 may send the credential or token to the processing system 116. In the embodiment shown in FIG. 1, the processing system 116 is an access control system. It is contemplated that the processing system 116 may also be a payment processing system or the like. For example, the processing system 116 processes the secure data to determine whether a user of the mobile device 102 should be allowed access to an area or whether a payment has been approved. It is contemplated that the reader device 108 and/or the sensors 114 may make this determination.

Figure 2:
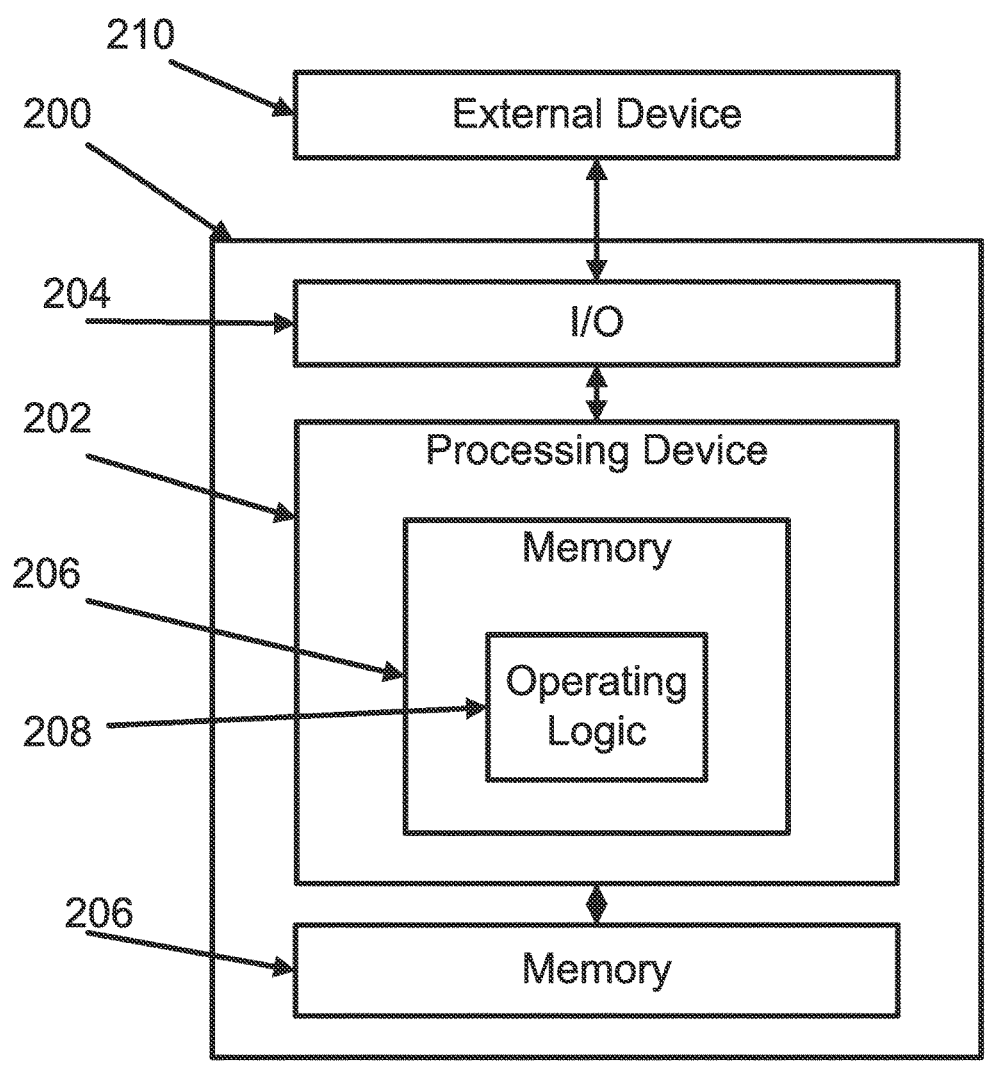
FIG. 2 is a schematic block diagram of an exemplary computing device.

FIG. 2 is a schematic block diagram of a computing device 200. The computing device 200 is one example of a mobile device, reader device, sensor, or processing system configuration which may be utilized in connection with the mobile device 102, reader device 108, sensor 114, or processing system 116 shown in FIG. 1. Computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a transceiver, network adapter, network card, interface, or a port (e.g., a USB port, serial port, parallel port, an analog port, a digital port, VGA, DVI, HDMI, FireWire, CAT 5, or any other type of port or interface). The input/output device 204 may be comprised of hardware, software, and/or firmware. It is contemplated that the input/output device 204 will include more than one of these adapters, cards, or ports.

The external device 210 may be any type of device that allows data to be inputted or outputted from the computing device 200. For example, the external device 210 may be a mobile device, a reader device, equipment, a handheld computer, a diagnostic tool, a controller, a computer, a server, a processing system, a sensor, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

Processing device 202 can be a programmable type, a dedicated, hardwired state machine; or a combination of these; and it can further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing.

Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
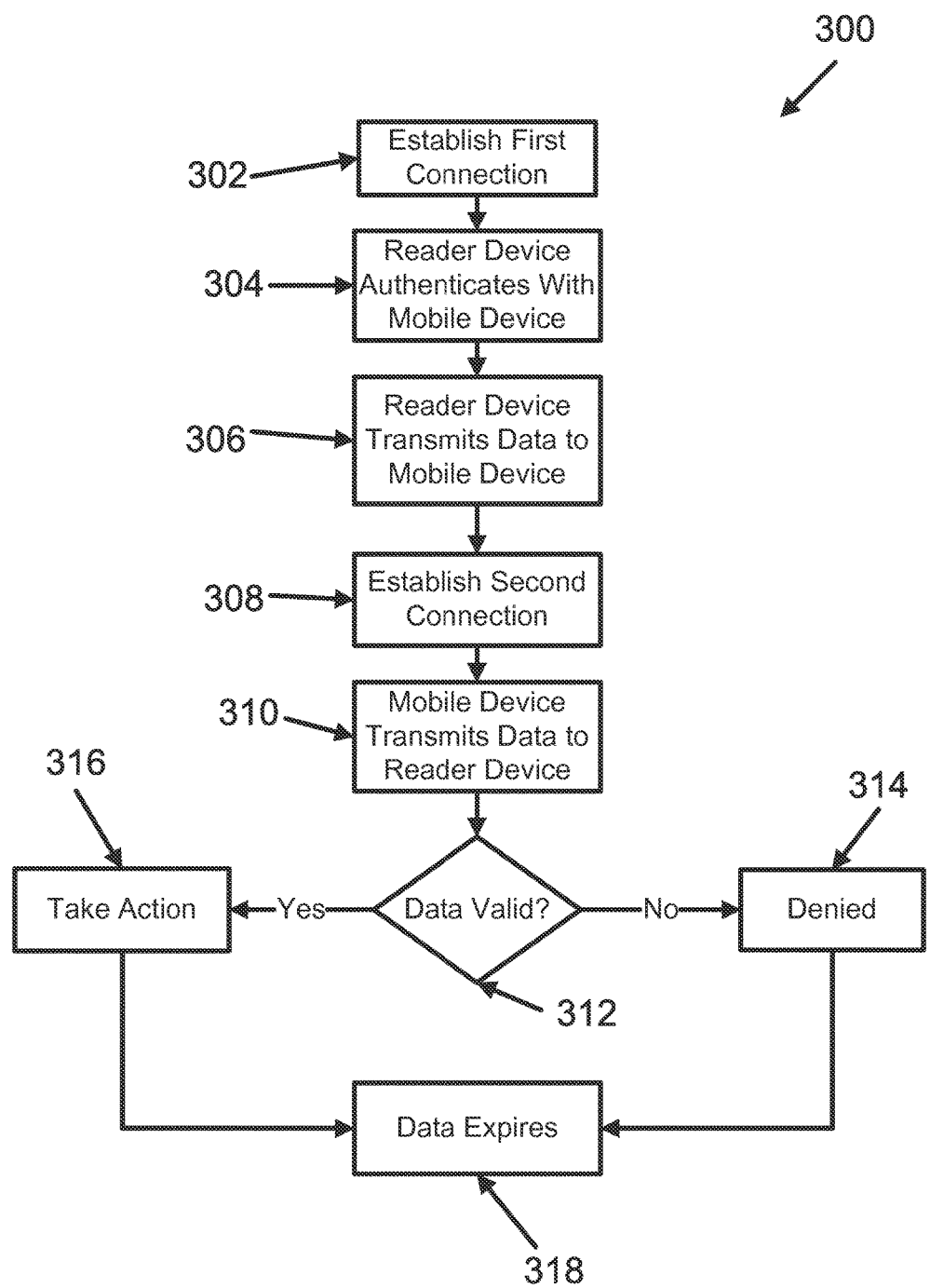
FIG. 3 is a schematic flow diagram of an exemplary process for conducting a transaction between a mobile device and a reader device.

FIG. 3 illustrates a schematic flow diagram of an exemplary process 300 for conducting a transaction between a mobile device and a reader device. Operations illustrated for all of the processes in the present application are understood to be examples only, and operations may be combined or divided, and added or removed, as well as re-ordered in whole or in part, unless explicitly stated to the contrary.

Process 300 begins at operation 302 in which the mobile device 102 and the reader device 108 establish a first connection utilizing a first carrier frequency or network band that operates over a relatively greater range such as Bluetooth® low energy. For example, the mobile device 102 may come within 15-20 meters of the reader device 108.

Process 300 then proceeds from operation 302 to operation 304. At operation 304, the reader device 108 authenticates with the mobile device 102. As one example, the mobile device 102 may transmit a credential to the reader device 108 that is verified by the reader device 108 or processing system 116. As another example, the mobile device 102 and the reader device 108 may exchange one or more pieces of information such as a PIN or password, or satisfy challenges.

After the mobile device 102 and the reader device 108 have authenticated with each other, process 300 proceeds from operation 304 to operation 306. At operation 306, the reader device 108 transmits a token or credential to the mobile device 102. This token or credential will be used by the mobile device 102 to request an action once the mobile device 102 is closer to the reader device 108. The token or credential may be stored on the mobile device 102 and may expire after a configurable amount of time.

Process 300 then proceeds from operation 306 to operation 308. At operation 308, the mobile device 102 and the reader device 108 establish a second connection utilizing a second carrier frequency or network band that operates at a relatively smaller range such as NFC. For example, the mobile device 102 may come within one foot of the reader device 108.

Process 300 then proceeds from operation 308 to operation 310. At operation 310, the mobile device 102 transmits the token or credential it previously received from the reader device 108 back to the reader device 108 over the second carrier frequency or network band. The mobile device 102 may also transmit further secret data that may be needed for an access control decision or a payment transaction.

Process 300 then proceeds from operation 310 to operation 312. At operation 312, the reader device 108 may determine whether the token or credential is valid. For example, the reader device 108 may determine if the token it received is the same as the token it previously sent to the mobile device 102. In addition, the reader device 108 may determine whether the token was received within a particular time threshold. It is contemplated that the reader device 108 may transmit the received token to the processing system 116 so that the processing system 116 may perform some or all of this data validation operation.

If the reader device 108 determines that the token or credential is not valid, the process 300 proceeds from operation 312 to operation 314. At operation 314, the reader device 108 takes no action such as denying an entry request or denying a payment.

If the reader device 108 determines that the token or credential is valid, the process 300 proceeds from operation 312 to operation 316. At operation 316, the reader device 108 may take the appropriate action or transmit the token or credential to the processing system 116. The reader device 108 and/or the processing system 116 may process the token and any other secret data received from the mobile device 102 to determine, e.g., whether the mobile device 102 may access an area or whether a payment should be allowed.

The reader device 108 then takes the action determined. For example, if the reader device 108 is an electronic lock, the reader device 108 will open the lock. As another example, if the reader device 108 is a payment terminal, the reader device 108 will accept the payment and complete the transaction. Other types of reader devices and use cases are contemplated.

Process 300 then proceeds from operation 314 or 316 to operation 318. At operation 318, the token or credential received by the mobile device 102 expires.

Figure 4:
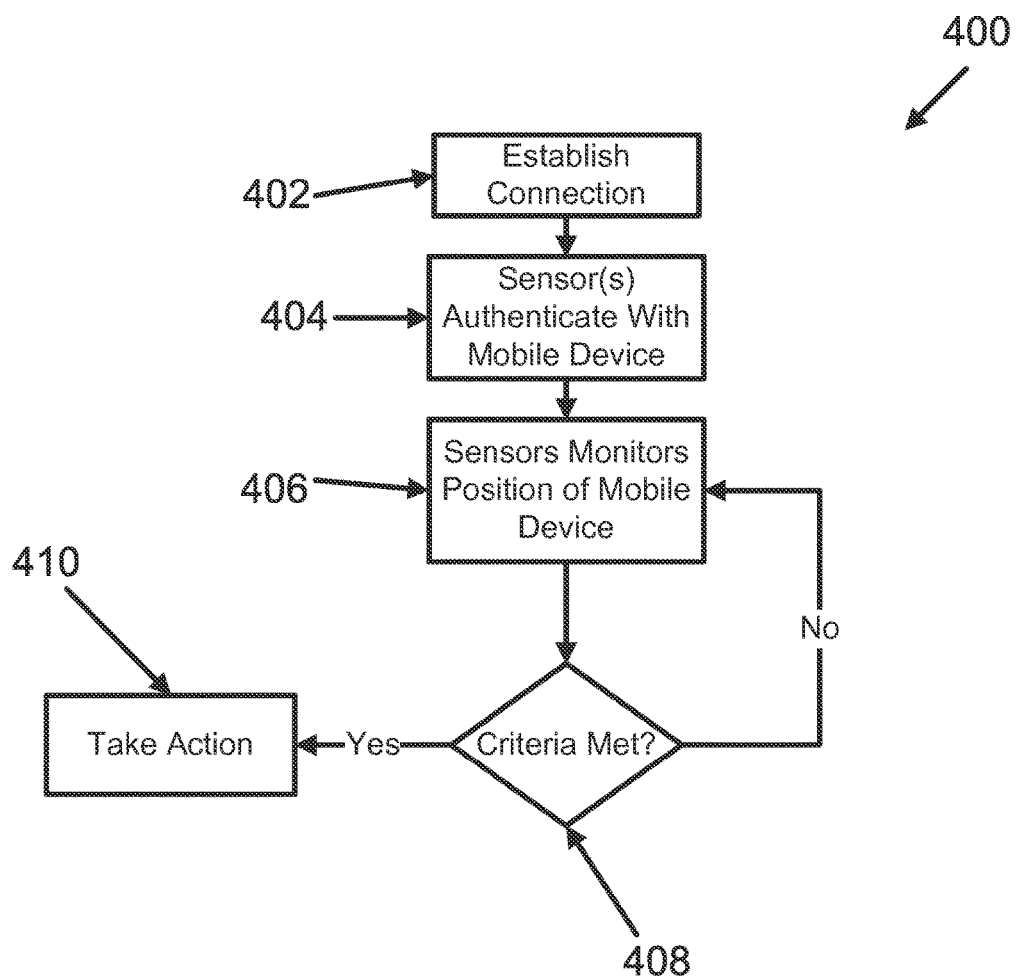
FIG. 4 is a schematic flow diagram of an exemplary process for conducting a transaction between a mobile device and one or more sensors.

FIG. 4 illustrates a schematic flow diagram of an exemplary process 400 for conducting a transaction between a mobile device and one or more sensors. Process 400 begins at operation 402 in which the mobile device 102 and the sensors 114 establish a connection utilizing, e.g., Bluetooth® low energy. For example, the mobile device 102 may come within 15-20 meters of the sensors 114.

Process 400 then proceeds from operation 402 to operation 404. At operation 404, at least one of the sensors 114 authenticates with the mobile device 102. As one example, the mobile device 102 may transmit a credential to one or more of the sensors 114, which may be verified by one of the sensors 114 and/or the processing system 116. As another example, the mobile device 102 and the reader device 108 may exchange one or more pieces of information such as a PIN or password, or satisfy challenges.

Process 400 then proceeds from operation 404 to operation 406. At operation 406, the sensors 114 monitor the position of the mobile device 102. The sensors 114 triangulate the position of the mobile device 102.

Process 400 then proceeds from operation 406 to operation 408. At operation 408, the sensors 114 determine whether certain criteria has been met. It is contemplated that in some embodiments the processing system 116 may perform some or all of the determination step at operation 408.

The sensors 114 determine whether the triangulated position of the mobile device 102 is within a certain range of an object (such as a door or payment terminal). For example, if the triangulated position of the mobile device 102 is within two feet of a door and stays within that distance for certain amount of time, then the process 400 proceeds from operation 408 to operation 410. The sensors 114 track the amount of time the mobile device 102 was within a certain distance of the object of interest to eliminate a user who may be walking by the door or payment terminal who does not wish to enter the secure area or make a payment. It is contemplated that the sensors 114 may determine whether the user made a gesture such as waving the mobile device 102 to indicate the user's desire to access area or make a payment with or without tracking the amount of time for the gesture.

At operation 410, if the system 100 is an access control system, the door is unlocked, and if the system 100 is a payment system, the payment is accepted or the payment information is forwarded to the processing system 116 for processing.

If the criteria is not met in operation 408, then the process 400 proceeds back to operation 406 to continue to monitor the mobile device 102 until the mobile device 102 is no longer in range of the sensors 114.

The times and distances referenced in the present application are examples. Any times or distances used in a system are generally dependent upon the characteristics of that system.

The various aspects of the processes 300 and 400 in the present application may be implemented in operating logic 208 as operations by software, hardware, artificial intelligence, fuzzy logic, or any combination thereof, or at least partially performed by a user or operator. In certain embodiments, operations represent software elements as a computer program encoded on a computer readable medium, wherein the mobile device 102, reader device 108, sensors 114, and/or processing system 116 performs the described operations when executing the computer program.

In one exemplary embodiment, a second wireless network band with a relatively greater range is utilized to authenticate a mobile phone with a lock or terminal before the user shows intent to open the door or make a payment. This allows the lock and the mobile phone to mutually authenticate and exchange a secure credential before the mobile phone is presented to the door or terminal.

In another exemplary embodiment, an entry request device includes three wireless sensors mounted around the outside of the door opening, one on the left, one on the right and one at the top of the door frame. The devices may be synchronized and may be mounted in this configuration so that the devices can triangulate on and determine the position of the user with a smartphone. When the user is positioned in front of the door an entry request is generated and sent to an access control system. The three wireless sensors may be hardwired or they may connect wirelessly to an access control system. The wireless sensors may also be hardwired or they could communicate directly with a lock on the door or opening.

One aspect of the present application may include a method, comprising: establishing a first wireless connection between a mobile device and a reader device via a long range communication protocol; authenticating the mobile device with the reader device; transmitting a token from the reader device to the mobile device via the long range communication protocol; establishing a second wireless connection between the mobile device and the reader device via a short range communication protocol; receiving the token at the reader device from the mobile device via the short range communication protocol; determining whether the token is valid; and performing an action if the token is valid.

Features of the aspect of the present application may include: wherein the long range communication protocol is Bluetooth®; wherein the short range communication protocol is NFC; wherein performing the action includes one of granting an access control request and granting a payment request; wherein the token is configured to expire after a period of time; wherein the mobile device is a mobile phone.

Another aspect of the present application may include a system, comprising: a reader device including at least one transceiver structured to communicate over a first communication protocol and a second communication protocol; a mobile device including at least one transceiver structured to communicate over the first communication protocol and the second communication protocol; and a processing device in communication with the reader device, wherein the reader device is configured with non-transitory computer executable instructions to authenticate the mobile device over the first communication protocol and to transmit a credential to the mobile device over the first communication protocol, wherein the mobile device is configured with non-transitory computer executable instructions to transmit the credential to the reader device over the second communication protocol, wherein the processing device is configured with non-transitory computer executable instructions to receive the credential from the reader device, determine whether the credential valid, and perform an action if the credential is valid.

Features of the aspect of the present application may include: wherein the first communication protocol is Bluetooth® and the second communication protocol is NFC; wherein the action includes one of granting an access control request and granting a payment request; wherein the credential is configured to expire.

Yet another aspect of the present application may include a method, comprising: establishing a wireless connection between a mobile device and a plurality of sensors; receiving a credential from the mobile device with at least one of the sensors; monitoring a position of the mobile device with the sensors; determining whether a predetermined criteria has been satisfied based on the position of the mobile device with respect to an object; and performing an action if the credential is valid and if the predetermined criteria is satisfied.

Features of the aspect of the present application may include: wherein monitoring the position of the mobile device includes triangulating the position of the mobile device with the sensors; wherein the sensors are Bluetooth® sensors; wherein the plurality of sensors includes at least three sensors; wherein determining whether the predetermined criteria has been satisfied includes determining whether the position of the mobile device is within a predetermined distance of the object for a predetermined amount of time; wherein determining whether the predetermined criteria has been satisfied includes identifying a predetermined gesture made with the mobile device; wherein the action includes one of granting an access control request and granting a payment request; wherein the mobile device is a mobile phone.

Another aspect of the present application may include a system, comprising: at least three sensors; a mobile device configured to transmit a token to at least one of the sensors; and a processing device in communication with at least one of the sensors, wherein the sensors are configured to triangulate a position of the mobile device and determine whether a predetermined criteria has been satisfied based on the position of the mobile device with respect to an object, and wherein the processing device is configured to perform an action if the token is valid and if the predetermined criteria is satisfied.

Features of the aspect of the present application may include: wherein the action includes one of granting an access control request and granting a payment request; wherein the sensors are Bluetooth® sensors; wherein the predetermined criteria includes the position of the mobile device being within a predetermined distance of the object for a predetermined amount of time; wherein the predetermined criteria includes a predetermined gesture being made with the mobile device; wherein the mobile device is a mobile phone.

While the invention has been described in connection with what is presently considered to be the preferred embodiment, it is to be understood that the invention is not to be limited to the disclosed embodiment(s), but on the contrary, is intended to cover various modifications and equivalent arrangements included within the spirit and scope of any appended claims, which scope is to be accorded the broadest interpretation so as to encompass all such modifications and equivalent structures as permitted under the law. Furthermore it should be understood that while the use of the word "preferable," "preferably," or "preferred" in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
    establishing a first wireless connection between a mobile device and a reader device over a long range communication protocol, wherein the reader device includes at least one transceiver for communication between the reader device and the mobile device over multiple carrier frequencies or network bands, wherein the reader device includes a lock associated with a door and the first wireless connection is established when the mobile device is a first distance from the reader device, wherein the first distance is greater than a second distance from the reader device;
    authenticating the mobile device with the reader device while the first wireless connection is established;
    triangulating, by a plurality of sensors position around the door, a position of the mobile device with respect to the door after the mobile device is authenticated and tracking an amount of time the mobile device is within a predetermined distance from the door,
    transmitting, with the reader device, a token from the reader device to the mobile device over the long range communication protocol via the first wireless connection while the mobile device is outside the second distance from the reader device, wherein the token is used by the mobile device to request an action from the reader device once the mobile device is within the second distance from the reader device and the token is configured to expire after a period of time;

storing the token on the mobile device;

after storing the token on the mobile device, wirelessly connecting the mobile device and the reader device over a short range communication protocol via a second wireless connection in response to the mobile device being within the second distance from the reader device;

determining, by the plurality sensors, the mobile device being within the second distance from the reader device for a predetermined amount of time and determining, by the plurality of sensors, a predetermined gesture being made with the mobile device;

transmitting, by the mobile device, the token over the short range communication protocol via the second wireless connection from the mobile device to the reader device in response to the predetermined gesture being made and to the mobile device being within the second distance from the reader device for the predetermined amount of time;

receiving by the reader device, the token from the mobile device over the short range communication protocol via the second wireless connection;

determining, by the reader device, the token is valid in response to the token being received from the mobile device by the reader device over the short range communication protocol via the second wireless connection within a time threshold; and unlocking, by the reader device, the lock in response to the token being valid, the predetermined gesture being made with the mobile device, and the mobile device being within the predetermined distance for the predetermined amount of time.

2. The method of claim 1, wherein the long range communication protocol is a wireless protocol.

3. The method of claim 1, wherein the short range communication protocol is near field communications enabled.

4. The method of claim 1, wherein the mobile device is a mobile phone.

5. A system, comprising:
a reader device including at least one transceiver structured to communicate over a first communication protocol and a second communication protocol, wherein the first communication protocol is a long range protocol and the second communication protocol is a short range protocol, wherein the reader device includes a lock associated with a door;
a plurality of sensors positioned around the door;
a mobile device including at least one transceiver structured to communicate over the first communication protocol and the second communication protocol; and
a processing device in communication with the reader device,
wherein the reader device is configured with non-transitory computer executable instructions to authenticate the mobile device over the first communication protocol and to transmit a credential to the mobile device over the first communication protocol,
wherein the plurality of sensors triangulate a position of the mobile device with respect to the door after the mobile device is authenticated and track an amount of time the mobile device is within a predetermined distance from the door,
wherein the mobile device is configured with non-transitory computer executable instructions to receive the credential over the first communication protocol via a first wireless connection while the mobile device is a first distance from the reader device and to store the credential in a memory of the mobile device, wherein the stored credential is used by the mobile device to request an action from the reader device once the mobile device is within a second distance from the reader device and the stored credential is configured to expire after a period of time, the mobile device further being configured to connect to the transceiver of the reader device via a second wireless connection and transmit the credential to the reader device over the second communication protocol in response to the mobile device being within the second distance from the reader device, wherein the second distance is less than the first distance,
wherein the plurality of sensors are configured to determine the mobile device is within the second distance from the reader device for a predetermined amount of time and determine a predetermined gesture that is made with the mobile device,
wherein the mobile device is configured to transmit the token over the short range communication protocol via the second wireless connection from the mobile device to the reader device in response to the predetermined gesture being made and to the mobile device being within the second distance from the reader device for the predetermined amount of time,
wherein the processing device is configured with non-transitory computer executable instructions to receive the credential from the reader device, determine the credential valid in response to the credential being received from the mobile device by the reader device over the second communication protocol via the second wireless connection within a time threshold, and unlock the lock in response to the credential being valid, the predetermined gesture being made with the mobile device, and the mobile device being within the predetermined distance for the predetermined amount of time.

6. The system of claim 5, wherein the first communication protocol is a wireless protocol and the second communication protocol is near field communications enabled.

7. The system of claim 5, wherein the credential is configured to expire.

8. The method of claim 1, wherein the first distance is more than 15 meters from the reader device and the second distance is within one foot of the reader device.

9. The system of claim 5, wherein the first distance is more than 15 meters from the reader device and the second distance is within one foot of the reader device.

* * * * *